A. W. SOUTHEY.
MEANS FOR PRODUCING GASEOUS FUEL FROM LIQUID HYDROCARBONS.
APPLICATION FILED AUG. 5, 1911.
1,031,881.
Patented July 9, 1912.
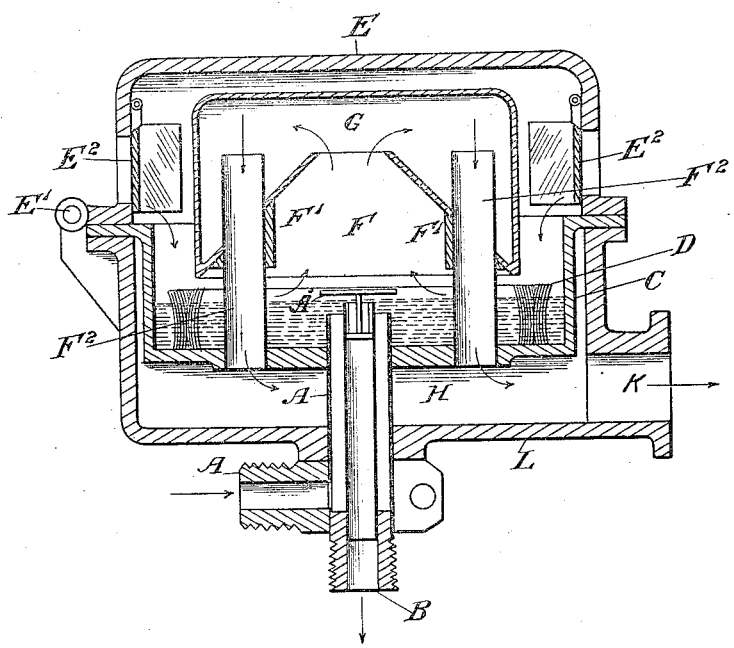
Witnesses:
A. L. Weaver
R. M. Stockman.
Inventor:
Alfred W. Southey
By Meyers, Cushman & Rea
his Attys.

UNITED STATES PATENT OFFICE.

ALFRED WILLIAM SOUTHEY, OF EDGWARE, ENGLAND, ASSIGNOR TO PRODUCERS LIMITED, OF LONDON, ENGLAND.

MEANS FOR PRODUCING GASEOUS FUEL FROM LIQUID HYDROCARBONS.

1,031,881.   Specification of Letters Patent.   Patented July 9, 1912.

Application filed August 5, 1911. Serial No. 642,472.

*To all whom it may concern:*

Be it known that I, ALFRED WILLIAM SOUTHEY, a subject of the King of Great Britain and Ireland, residing at Cherry House, Hale Lane, Edgware, in the county of Middlesex, England, have invented new and useful Improvements in Means for Producing Gaseous Fuel from Liquid Hydrocarbons or Equivalent Substances, of which the following is a specification.

This invention relates to the production of gaseous fuel from liquid hydrocarbons or equivalent substances and has for its object the production of the same in the form of a fixed gas enriched with a proportion of condensable vapor to form a practical fuel for internal combustion engines. Liquid hydrocarbons or equivalent substances are to this end burned with a limited amount of air, the partial combustion producing the necessary heat for converting a large proportion of the unburned portion of the vapor produced from the fuel into fixed gas, leaving a proportion of less condensable vapor. The fixed gas is enriched with condensable oil vapor, equal to 20% of the oil used, and as an excess of condensable vapor produces a "dirty" exhaust, foul sparking plugs, and dilutes the lubricating oil in the crank case of the engine, the importance of a high percentage of fixed gas will be understood.

In apparatus described in my specification No. 26749 of 1909, I provide means for sub-dividing the fuel and exposing the part so sub-divided to the action of heat in order to produce vapor of sufficient density to allow fixative combustion to take place without interfering with the generation of a gas of good calorific value.

According to my present invention, to more effectually increase the density of the vapor I provide means for regeneratively heating a portion of the liquid fuel by passing the fixation flame and heated gases under the trough containing it. Moreover, the fixed gas and condensable vapor that are to form the gaseous fuel are produced by the partial combustion of this dense vapor in a chamber to which air is admitted at approximately atmospheric pressure and it is of great importance that the mixture of vapor and air should be made as complete as possible before the burning gases are under the direct influence of the suction for drawing the mixture through the apparatus, as air and vapor will not readily mix under that condition.

The desired end is attained, according to the present invention by exposing the liquid to be vaporized in a container provided with a baffle so as to inclose one portion and thus form a chamber to which a gas educt is or educts are connected, the liquid being ignited in the open part of the container and the flame by suction at the educt or educts drawn under the baffle to pass over the further fuel, the area of fuel over which the flame is thus drawn and the extent of space between the baffle and the fuel being regulated to produce the desired quality of gas.

I have found that when the velocity of flow of the gas and air through the apparatus is increased, air is drawn through without mixing with the vapor or increasing the flame, the result being that the percentage of fixed gas generated per cubic foot of air is reduced as the speed of the flow of air increases. The fixation is effected most perfectly at low velocities, a more intimate mixture being formed if the gases are not moving rapidly. It is desirable therefore, to aid the formation of a perfect mixture by admitting the air at a point or points where the velocity of the mixture is lowest and drawing away the mixture at the point or points of the highest velocity. If the air supply be restricted an excessive quantity of condensable vapor is produced, which must be avoided. Therefore, according to the present invention the air is admitted to the combustion chamber through an opening or openings of considerably greater extent than that of the educt or educts for the fixed gas. In this manner the air enters at a comparatively low velocity and leaves at its highest velocity and at the same time is permitted to permeate to the greatest degree possible the vapor in the combustion chamber.

In carrying the invention into effect, a chamber is constructed preferably circular in form within which is a trough of metal into which the liquid fuel is fed preferably by a pump, any excess passing away by an overflow pipe. The fuel supply must not be greatly in excess of the quantity required for use or a large proportion of the heat will be conducted away by this circulation of the fuel. A chamber where the air and vapor are mixed while burning is formed by a depending baffle fitted at such a distance above the level of the fuel in the trough, that the air is free to enter. The burning gases on their way to the cylinder pass through educts so arranged that the gases heat the fuel in the trough, thus producing a regenerative action.

The action of the apparatus is as follows: Wicks in the metal trough, which are used for starting purposes only, are ignited; suction is now induced by turning the engine supplied by the apparatus, the vapor rising from the heated wicks is drawn together with air under the edge of the depending baffle and passed through the mixing chamber formed by the same to the educts which pass through the metal trough, the flame and heated gases regeneratively heating the fuel and increasing the density of the vapor.

Reference is made to the accompanying drawing, which shows a sectional elevation of an apparatus embodying this invention. Within a circular metal casing L is arranged a circular metal trough C to which liquid fuel is supplied through the supply pipe A from a pump or other source of supply not shown in the drawing. The level of the fuel in the trough C is determined by the height of the overflow pipe B, through which superfluous fuel is led away from the apparatus. Above the supply pipe A there is arranged a small baffle plate A' for the purpose of preventing the liquid fuel supplied from spurting upward. Within the trough C is placed an annular wick D, preferably of asbestos which is used for igniting purposes. The bottom of the trough C supports a pipe or pipes $F^2$ which are open top and bottom and serve as the educts for the gases and lead them down to the chamber H between the trough C and the casing L, whence the gases pass by the educt K to the engine. The pipes $F^2$ support the baffle F in the shape of a truncated cone which rests on shoulders F' on the pipes $F^2$. This arrangement permits of the baffle being readily removed for cleaning. The baffle depends to near the fuel in the trough C and is surrounded and covered by a cap G which is supported from the base of the baffle and is removable with it. The whole apparatus is closed by the cover E of the casing L, the cover and casing being hinged together at E'. In the side of the cover E are a number of ports covered by flaps $E^2$. The ports admit air at substantially atmospheric pressure and the flaps prevent the escape of flame from the apparatus when the suction of the engine ceases. On the wick D being ignited and suction produced by turning the engine, air is drawn in at approximately atmospheric pressure through the ports in the cover E, and passes to the combustion chamber outside the baffle F and cap G, whence the gases pass under the baffle to the fixing chamber between the latter and the cap, and from here they are drawn down through the educt pipes $F^2$ and induction pipe K to the engine. In passing through the pipes $F^2$ the hot gases regeneratively heat the fuel in the trough C as and for the purpose above explained. The flow of the air and gases is indicated by arrows.

It will be seen that the baffle F deflects the air and flame in the chamber outside the baffle downward toward the fuel in the trough C so that the mixture of the flame and air is enhanced thereby. It will also be observed that the air enters the combustion chamber all around the edge of the chamber, but that it is drawn off through the pipes $F^2$ $F^2$ so that the speed of flow is greatest on leaving and least where the air enters.

I do not limit the scope of my invention to the special apparatus described: any modification of the apparatus may be made as long as the principle of the invention is adhered to. The fuel may be sprayed on a baffle and ignited, so that the baffle will regeneratively heat the fuel and cause a dense vapor to be generated to be mixed with air for partial combustion under the conditions described.

Claims.

1. In an apparatus for producing a gaseous fuel from liquid hydrocarbon or the like by fixative combustion of the vaporized hydrocarbons, a fuel container, an air inlet means, and an educt for the combined heated air and gases arranged to pass through the fuel for regeneratively heating the same.

2. In an apparatus for producing a gaseous fuel from liquid hydrocarbons or the like by fixative combustion of the vaporized hydrocarbons, a container for the fuel, a depending baffle above the container, means for admitting air to the container, and educts for drawing off the mixed air and vapor from under the baffle, said educts serving as supports for the baffle.

3. In an apparatus for producing a gaseous fuel from liquid hydrocarbons or the like from fixative combustion of the vaporized hydrocarbon, a container for the fuel, a depending baffle above the container, an educt for the gases passing through said baffle and supporting the same, and means for admitting air to the container, said educt serving to draw the mixed air and vapor under the baffle and through the hydrocarbon liquid for regeneratively heating the same.

4. In apparatus for producing a gaseous fuel from liquid hydrocarbons or the like by fixative combustion of the vaporized hydrocarbon, a container for the fuel, a depending baffle above the container, parts for admitting air to the container, and means through which the mixed air and vapor are drawn off under the baffle and through the container for regeneratively heating the fuel in said container.

5. In apparatus for producing a gaseous fuel from liquid hydrocarbons or the like by fixative combustion of the vaporized hydrocarbon, a container for the fuel, a depending baffle above the container, parts for admitting air at atmospheric pressure to the container, and educts through which the mixed air and vapor are drawn off under the baffle and through the container for regeneratively heating the fuel in said container, the area of the educts being less than the area of the air ports.

6. In apparatus for producing a gaseous fuel from liquid hydrocarbons or the like by fixative combustion of the vaporized hydrocarbon, a container for the fuel, a depending baffle above the container, an aperture for admitting air to the container and an educt through which the fixed gases are drawn off, the educt having an aperture of less area than the area of the air inlet aperture.

7. In apparatus for producing a gaseous fuel from liquid hydrocarbons or the like by fixative combustion of the vaporized hydrocarbon, a container for the fuel, air inlets adapted to admit air to the container and educts having a combined area less than the air inlets through which the fixed gases are drawn off, the air inlets and educts being respectively so disposed and formed as to admit the air at a low velocity and pass off the mixed air and gases at a higher velocity.

8. An apparatus for producing a gaseous fuel from liquid hydrocarbons or the like by fixative combustion of the vaporized hydrocarbon, comprising a fuel container, a depending baffle above said container, openings disposed around the container and adapted to admit air at substantially atmospheric pressure, an educt for the fixed gases so disposed as to draw the air and vapor under the baffle, and means adapted to cause the burning gas to regeneratively heat the fuel in the container.

9. An apparatus for producing a gaseous fuel from liquid hydrocarbons or the like by fixative combustion of the vaporized hydrocarbon, comprising a fuel container a wick for igniting purposes within the container, a depending baffle above said container, openings disposed around the container and adapted to admit air at substantially atmospheric pressure, an educt for the fixed gases so disposed as to draw the air and vapor under the baffle and extending into a passage passing immediately beneath the fuel container and adapted to allow the burning gas to regeneratively heat the fuel in the container.

ALFRED WILLIAM SOUTHEY.

Witnesses:
JOHN HENRY RUSSON,
LOVELL NEWTON RUDDIE.

Copies of this patent may be obtained for five cents each, by addressing the "Commissioner of Patents, Washington, D. C."